United States Patent [19]

Boardman et al.

[11] Patent Number: 5,468,815
[45] Date of Patent: Nov. 21, 1995

[54] LOW COEFFICIENT OF FRICTION SILICONE RELEASE FORMULATIONS INCORPORATING HIGHER ALKENYL-FUNCTIONAL SILICONE GUMS

[75] Inventors: Larry D. Boardman, Woodbury; Kurt C. Melancon, Hugo; Trang D. Chau, Minneapolis; John J. Erickson, Little Canada, all of Minn.

[73] Assignee: Minnesota Mining and Manufacturing, St. Paul, Minn.

[21] Appl. No.: 180,212

[22] Filed: Jan. 12, 1994

[51] Int. Cl.$^6$ .................................... C08G 77/08
[52] U.S. Cl. ................ 525/478; 528/4; 528/15; 528/32; 528/31
[58] Field of Search .............. 505/478; 528/15, 528/31, 32

[56] References Cited

U.S. PATENT DOCUMENTS

| | | | |
|---|---|---|---|
| Re. 31,727 | 11/1984 | Eckberg | 428/429 |
| 4,340,647 | 7/1982 | Eckberg | 428/429 |
| 4,609,574 | 9/1986 | Keryk et al. | 427/407.1 |
| 4,870,149 | 9/1989 | Hara et al. | 528/15 |
| 4,923,944 | 8/1990 | Yamada et al. | 528/15 |
| 5,064,916 | 11/1991 | Sasaki et al. | 525/478 |
| 5,082,951 | 1/1992 | Muchowski et al. | 548/453 |
| 5,145,932 | 9/1992 | Sasaki et al. | 528/15 |
| 5,264,499 | 11/1993 | Hayashi et al. | 525/478 |
| 5,281,656 | 1/1994 | Thayer et al. | 524/601 |

FOREIGN PATENT DOCUMENTS

| | | |
|---|---|---|
| 0446030 | 9/1991 | European Pat. Off. . |
| 0446030A2 | 9/1991 | European Pat. Off. ....... C09D 183/04 |
| 61-159480 | 7/1986 | Japan ................. C09J 7/02 |
| 63-101453 | 5/1988 | Japan ................. C08L 87/07 |

*Primary Examiner*—Melvyn J. Marquis
*Assistant Examiner*—Margaret W. Glass
*Attorney, Agent, or Firm*—Gary L. Griswold; Walter N. Kirn; Christine T. O'Shaughnessy

[57] ABSTRACT

A curable coating composition comprising an ethylenically unsaturated organopolysiloxane base polymer, an organohydrogenpolysiloxane crosslinking agent, an effective amount of a precious metal containing hydrosilylation catalyst, and from 0.1 to 20 weight of a higher alkenyl-functional organopolysiloxane gum. The incorporation of the gum provides a composition which cures rapidly to a low coefficient of friction coating having stable release over time.

12 Claims, 1 Drawing Sheet

5,468,815

LOW COEFFICIENT OF FRICTION SILICONE RELEASE FORMULATIONS INCORPORATING HIGHER ALKENYL-FUNCTIONAL SILICONE GUMS

TECHNICAL FIELD

This invention relates to curable silicone release formulations that are curable to coatings that exhibit both stable release from a broad range of pressure-sensitive adhesives and low coefficients of friction.

BACKGROUND

Silicone release formulations are known and find utility in a variety of applications. Generally they are applied to a surface from either a solvent-based composition or a solvent-free composition. Solvent-based compositions typically result in cured coatings which exhibit a significantly lower coefficient of friction (COF) than do solvent-free compositions. While it is not fully understood why this is so, it is believed that it is at least partially due to the higher molecular weight of the segments between the functional groups present in the solvent-based compositions.

Solvent-free systems are usually based on relatively highly functionalized silicone polymers in the 2,000 to 30,000 molecular weight range and typically yield densely crosslinked, very rubbery feeling coatings. Formulations designed for solvent delivery, on the other hand, normally contain polymers with molecular weights in excess of 100,000 containing relatively fewer functional groups as the major silicone component. Cured coatings of these systems will have a much higher molecular weight between crosslinks, and the motion and flexibility of these long, unrestricted lengths of polydimethylsiloxane are believed to be largely responsible for the much more slippery feel of these coatings.

Typically, COF values for solvent-cast and solvent-free coatings are 0.05 and 0.40, respectively. These values are measured on a cured coating applied to polyethylene coated kraft paper at a coating weight of 1 g/m$^2$.

For many applications, such as those requiring hand application of a transfer adhesive, higher COF is a serious disadvantage. For example, in such an application the user typically applies one face of the adhesive to a surface with a release liner in place on the second exposed adhesive surface. He or she then applies pressure to the release liner to secure the adhesive to the surface. The release liner may then be removed to expose the second face of adhesive.

In applying pressure to the release liner, the user often encounters resistance due to friction. If this resistance is too great, he or she may develop calluses or blisters on his or her fingers. It is desirable, therefore, to minimize this resistance. This may be accomplished by reducing the COF. While solvent-based compositions do provide a low COF, they require the use of special equipment to remove and recover the solvent. This undesirably adds to the complexity and cost of processing these systems.

Solvent-free systems, while not requiring the use of this special equipment, typically do not provide the low COF needed. Thus, they do not fulfill the need of the user.

A variety of approaches have been tried in order to obtain a low COF solvent-free silicone release coating. For example, Japanese KOKAI SHOWA 61-159480 (published Jul. 19, 1986) discloses a solvent-free, addition curable composition in which a few weight percent (wt %) of a high molecular weight vinyl functional silicone gum is incorporated in the formulation. For this approach to succeed, it is critical that the added gum incorporate a significantly lower level of functionality than the base polymer of the host formulation. If this condition is met, the gum apparently is preferentially expressed at the surface of the coating during the curing process leading to reductions in the COF.

Other approaches to reducing COF in addition curable formulations that have been described include the use of both branched siloxanes (see U.S. Pat. No. 5,082,951) and siloxanes having a trivinylsiloxy group at one end of the base polymer (see U.S. Pat. No. 4,870,149). The in situ generation of branched siloxanes in addition cure systems as a means of achieving reductions in COF, has been disclosed in Japanese KOKAI SHOWA 63-101453 and the in situ synthesis of siloxane gums has been disclosed in European Patent Publication No. 0 446 030 A2. The addition of vinyl functional gums to addition curable release formulations as cure accelerators has been disclosed in Re. 31,727.

As used in the prior art, a vinyl-functional polymer or gum is one in which the $CH_2=CH-$ groups are attached directly to the silicon atoms of the organopolysiloxane polymer or gum. Although the use of vinyl-functional gums does reduce the COF, it also reduces the rate of cure in higher alkenyl-functional systems.

SUMMARY OF THE INVENTION

The present invention provides a curable coating composition comprising (a) an ethylenically unsaturated organopolysiloxane base polymer;

(b) an organohydrogenpolysiloxane crosslinking agent;

(c) an effective amount of a precious metal-containing hydrosilylation catalyst; and (d) from 0.1 to 20 weight percent of the composition of a higher alkenyl-functional organopolysiloxane gum.

The incorporation of the higher alkenyl-functional siloxane gum provides a coating composition which cures rapidly to a coating that exhibits a low COF and stable release over time. In the context of this invention, a higher alkenyl-functional polymer or gum is one which the alkenyl groups contain terminal unsaturation and have three or more carbon atoms, and the $CH_2=CH-$ groups are not attached directly to the silicon atoms of the polymer or gum.

The coating composition described herein is preferably solvent-free. It is useful as a rapidly curable silicone release formulation. The cured formulation provides a silicone coating that gives stable release from a broad range of pressure-sensitive adhesives and exhibits a low coefficient of friction. This formulation is potentially useful in any application in which one or both of these properties is desired and is particularly useful where stable premium release is desired. As used herein, premium release means a release force less than or equal to about 0.6 newtons per decimeter (N/dm) width.

The present invention also provides a substrate bearing a cured coating of the composition and an adhesive article that employs the coated substrate. Examples of materials of these types include release liners, single and double-sided adhesive tapes, adhesive transfer tapes, labelling materials, die cuts and the like.

BRIEF DESCRIPTION OF THE DRAWINGS

The various utilities of the composition of the invention are further illustrated in the accompanying drawings.

DETAILED DESCRIPTION

Figure 1:
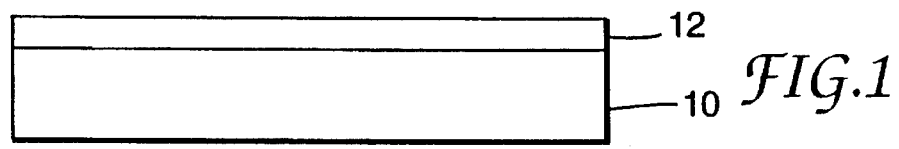
FIG. 1 is a plan view of a flexible substrate which has a coating of the composition of the invention on one of its surfaces.

The base polymer useful in the invention typically comprises a triorganosiloxy endblocked polydiorganosiloxane polymer having a viscosity at 25° C. of from about 25 to about 5000 centipoise, preferably from about 25 to about 1000 centipoise, more preferably from about 25 to about 500 centipoise. The base polymer preferably comprises $R_2SiO_{2/2}$ and $R_3SiO_{1/2}$ units, wherein each R group independently represents a saturated or ethylenically unsaturated, substituted or unsubstituted hydrocarbon radical, provided that at least two R groups contain terminal ethylenic unsaturation. The ethylenically unsaturated radicals are independently selected from the group consisting of the vinyl radical and higher alkenyl radicals represented by the formula —$R'(CH_2)_mCH$=$CH_2$ wherein R' denotes —$(CH_2)_n$— or —$(CH_2)_pCH$=$CH$— and m has the value of 1, 2, or 3; n has the value of 0, 3, or 6; and p has the value of 3,4, or 5. Preferably R' denotes —$(CH_2)_n$—. Preferably the alkenyl radicals are selected from the group consisting of the vinyl radical and the 5-hexenyl radical. The most preferred saturated hydrocarbon radical methyl radical.

While the ethylenically-unsaturated organopolysiloxane is described herein as linear and bearing only hydrocarbon radicals on silicon, it is within the scope and spirit of this invention to permit the presence therein of trace amounts of non-linear siloxane units, i.e., $SiO_{4/2}$ and $RSiO_{3/2}$, wherein R is as described above, and trace amounts of other silicon-bonded radicals, such as hydroxyl and alkoxyl.

The crosslinking agent useful in the invention preferably comprises an organopolysiloxane polymer preferably having a viscosity at 25° C. of less than 200 centipoise. Typically the crosslinking agent contains an average of at least three silicon-bonded hydrogen atoms per molecule. The crosslinking agent preferably comprises $R_3SiO_{1/2}$, $HR_2SiO_{1/2}$, $R_2SiO_{2/2}$, $HRSiO_{2/2}$, $RSiO_{3/2}$, and $SiO_{4/4}$ units, wherein R is as described above. R is preferably the methyl radical.

The ratio of the number of moles of silicon-bonded hydrogen atoms in the organohydrogenpolysiloxane crosslinking agent to the total number of moles of ethylenic unsaturation in the base polymer and the ethylenically-unsaturated organopolysiloxane gum (described hereinafter) ranges from about 0.5:1 to about 5:1, preferably from about 0.8:1 to about 2:1, more preferably from about 0.9:1 to about 1.5:1.

Ethylenically-unsaturated organopolysiloxanes and organohydrogenpolysiloxanes useful in the practice of the present invention are well known in the art and are disclosed in such patents as Ashby, U.S. Pat. No. 3,159,662; Lamoreaux, U.S. Pat. No. 3,220,972; and Joy, U.S. Pat. No. 3,410,886. Preferred ethylenically-unsaturated organopolysiloxanes are those containing higher alkenyl groups such as those described by Keryk et al., U.S. Pat. No. 4,609,574. The disclosures of these references with respect to the ethylenically-unsaturated organopolysiloxane base polymers and organohydrogenpolysiloxane crosslinking agents disclosed therein are incorporated herein by reference.

The hydrosilylation catalyst useful in the invention is any precious metal-containing hydrosilylation catalyst that is effective to catalyze the addition reaction of a compound containing at least one silicon-bonded hydrogen atom with a compound containing ethylenic unsaturation. The catalyst preferably contains platinum or rhodium. The catalyst is present in an effective amount ranging from about 1 to about 1000 parts of precious metal per one million pans of the composition, preferably from about 10 to about 200 parts.

Examples of useful hydrosilylation catalysts include chloroplatinic acid, platinum deposited on a substrate, platinum complexed with organic liquids, such as alcohols, aldehydes, and vinylsiloxanes, and complexes of rhodium halides. Preferably the hydrosilylation catalyst is soluble in the curable silicone release composition.

Hydrosilylation catalysts are well known in the organosilicon art and need no further delineation herein. For further details, if needed, the reader is directed to the teachings of Speier et al., U.S. Pat. No. 2,823,218; Willing, U.S. Pat. No. 3,419,593; Karstedt, U.S. Pat. Nos. 3,715,334 and 3,814,730; Ashby, U.S. Pat. No. 4,421,903; Lamoreaux, U.S. Pat. No. 3,220,972; Chandra et al., U.S. Pat. No. 4,603,215; Lewis, U.S. Pat. No. 4,705,765; Drahnak, U.S. Pat. Nos. 4,510,094 and 4,530,879; Eckberg, U.S. Pat. No. 4,670,531; Boardman et al., U.S. Pat. No. 4,916,169; and Oxman et al., U.S. Pat. No. 5,145,886. The disclosures of these references with respect to the hydrosilylation catalysts disclosed therein are incorporated herein by reference.

The organopolysiloxane gum useful in the invention is a triorganosiloxy endblocked polydiorganosiloxane polymer having an average molecular weight (as measured by gel permeation chromatography (GPC)) of at least about 75,000, preferably greater than about 150,000, more preferably greater than about 300,000. It comprises $R_2SiO_{2/2}$ and $R_3SiO_{1/2}$ units, wherein each R group independently represents a saturated or ethylenically unsaturated, substituted or unsubstituted hydrocarbon radical, provided that at least two R groups contain terminal ethylenic unsaturation. The ethylenically unsaturated radicals are independently selected from higher alkenyl radicals represented by the formula —$R'(CH_2)_mCH$=$CH_2$ wherein R' denotes —$(CH_2)_n$— or —$(CH_2)_pCH$=$CH$— and m has the value of 1, 2, or 3; n has the value of 0, 3, or 6; and p has the value of 3, 4, or 5. Preferably R' denotes —$(C_2)_n$—. The most preferred alkenyl radical is the 5-hexenyl radical. The most preferred saturated hydrocarbon radical is the methyl radical.

While the ethylenically-unsaturated organopolysiloxane gum is described herein as linear and bearing only hydrocarbon radicals on silicon, it is within the scope and spirit of this invention to permit the presence therein of trace amounts of non-linear siloxane units, i.e., $SiO_{4/2}$ and $RSiO_{3/2}$, wherein R is as described above, and trace amounts of other silicon-bonded radicals, such as hydroxyl and alkoxyl.

The number of ethylenically unsaturated radicals in the organopolysiloxane gum preferably ranges from a minimum of two per molecule to a maximum of about 5.0 mole percent of the average total number of silicon atoms present in the molecule. Preferably the number of ethylenically unsaturated radicals in the gum comprises less than about 2.0 mole percent, more preferably less than about 0.5 mole percent, and still more preferably less than about 0.2 mole percent of the average total number of silicon atoms.

The organopolysiloxane gum is present in an effective amount, preferably from about 0.5 to about 10.0 weight percent, more preferably from about 1.0 to about 5.0 weight percent of the composition. More than 20 weight percent of the gum may be used if desired. However, the viscosity of the composition is generally too high to coat conveniently when such a level of the gum is used.

Mixtures of one or more of each of the base polymers, the crosslinking agent, the hydrosilylation catalyst and the higher alkenyl-functional gum may be employed in the practice of the invention if desired. Additionally, the coating composition of the invention may contain other adjuvants if desired. These materials should not adversely interfere with the curing of the composition.

For example, the release characteristics of the composition may be modified by the use of controlled release additives. When applied to one surface of a substrate and cured, such coatings provide a surface having higher release levels than unmodified coatings. The opposite surface of the substrate may then be coated with an unmodified composition to provide a differential release liner. Such liners preferably have a release differential of at least 10% between the two surfaces. They are especially useful with adhesive transfer tapes.

Other additives may also be included. Specifically, the inclusion of pigments, rheology control additives, substrate-adhesion promoters, and adjuvants to control substrate-penetration by the coating composition is also contemplated within the scope of this invention.

The compositions of the present invention may also optionally contain an effective amount of an inhibitor for the metal hydrosilylation catalyst. As is well known, preferred inhibitors reduce the activity of the metal catalyst at room temperature thus increasing the time period during which the composition may be used at room temperature while still allowing rapid cure at elevated temperatures.

Hydrosilylation catalyst inhibitors are well known in the art and include such compounds as pyridine (U.S. Pat. No. 3,188,299), acrylonitrile (U.S. Pat. No. 3,344,111), 2-methyl-3-buten-2-ol (U.S. Pat. No. 3,445,420), organic phosphines and phosphites (U.S. Pat. Nos. 3,989,666 and 4,336,364), benzotriazole (U.S. Pat. No. 3,192,181), organic sulfoxides (U.S. Pat. No. 3,453,234), aminofunctional siloxanes (U.S. Pat. No. 3,723,567), ethylenically unsaturated isocyanurates (U.S. Pat. No. 3,882,038), olefinic siloxanes (U.S. Pat. Nos. 3,933,880, 3,989,666, and 3,989,667), alkenynes (U.S. Pat. No. 4,559,396), unsaturated carboxylic esters (U.S. Pat. Nos. 4,256,870, 4,347,346, 4,774,111, and 5,036,117), and unsaturated carboxylic amides (U.S. Pat. No. 4,337,332).

The compositions of the invention may be prepared by mixing the desired amounts of the above described components and any additional components in any suitable manner such as by stirring, blending and/or tumbling and in any suitable order. Preferably the organohydrogen polysiloxane crosslinking agent is added last.

The compositions may also be prepared by combining two non-curing compositions which, when mixed in proper proportions, will give rise to the curable coating composition. For example, one of the non-curing compositions may comprise a portion of the olefinic polydiorganosiloxane base polymer, a portion of the organopolysiloxane gum and the organohydrogenpolysiloxane crosslinking agent and another of the non-curing compositions comprises the balance of the olefinic polydiorganosiloxane base polymer, the balance of the organopolysiloxane gum, an inhibitor and the hydrosilylation catalyst. Alternatively, one of the non-curing compositions may comprise all of the components except the organohydrogenpolysiloxane crosslinking agent, which constitutes another non-curing composition to be mixed with the first non-curing composition at the proper time.

The compositions of the invention may be applied as a continuous layer to a substrate. Alternatively, it may be applied as a discontinuous layer such as in the form of one or more stripes, as individual islands, in a random or ordered pattern, etc.

Any solid substrate may be treated by the compositions of this invention to provide release of adhesive materials therefrom. Examples of suitable substrates include rubber, cellulosic materials, such as paper, cardboard, and wood; metals, such as aluminum, iron, and steel; siliceous materials, such as ceramics, glass, and concrete; and synthetic polymers, such as polyester, polyepoxide, and polyethylene. To assure proper curing and adhesion of the silicone coating, the substrate should be clean and free of materials which undesirably inhibit the cure of the release composition, such as materials containing certain amines, mercaptans and phosphines.

The curable coating compositions of this invention are particularly useful in preparing a laminate of substrate and an adhesive wherein the adhesive will release from the substrate. This laminate may be prepared by (a) coating the curable silicone composition of the present invention on the surface of the substrate either in a continuous process or at a later time; (b) curing the silicone release composition with an effective amount of heat and/or radiation; (c) applying an adhesive to the silicone surface of the substrate.

The curable silicone composition of this invention may be coated on the surface of the substrate by any of the well known methods for coating flexible substrates such as brushing, dipping, spraying, five smooth roll coating, knife over roll, reverse roll, and gravure. Any suitable amount of coating material may be applied to the substrate. Generally, a thin coating of the silicone release composition is employed. Typically the coating weight is approximately 0.1 to 5.0 grams of the curable silicone composition per square meter of coated surface with about one gram per square meter of coated surface being preferred.

Curing of the composition of the invention can be accomplished by a variety of methods. Typically, they are accomplished via a technique that is consistent with the catalyst used. Thus, for example, curing can be accomplished by exposure to heat, ultraviolet light, visible light, electron beam radiation, gamma radiation and the like. When heat is used to cure the composition, the curing mechanism can be initiated in any convenient way such as by infrared lamps, by radiation, or by forced air oven which is often most suitable. Curing can be accomplished at any convenient temperature, but typically it is most advantageous to use temperatures above room temperature such as from 50° C.

to 150° C. with temperatures of from 70° C. to 120° C. being preferred to provide rapid cure while conserving heat energy.

When UV light is used to initiate curing, it is preferably done by exposure to medium pressure ultraviolet lights. When gamma radiation is used, it is generally not necessary to employ a catalyst.

In preparing an article of the invention, an adhesive may be laminated to the cured release composition of the invention. Alternatively, it may be applied in-line to the cured silicone surface of the substrate. By in-line, it is meant that the adhesive is applied to the silicone coated surface of the substrate within a short time after the curing of the silicone, and without reeling and storing the silicone coated substrate prior to the adhesive application step. Alternatively, the adhesive may be applied at a later time rather than in-line by storing the coated substrate.

The adhesive may be applied by any of the well known methods such as by coating hot melt adhesives, solutions of adhesive in solvent or water, or dispersions of adhesives, or by pressing an adhesive film supported on a sheet material to either surface of the silicone coated surface.

The type of adhesive material used in the process of this invention is not critical and any of the well known materials can be used. Pressure-sensitive adhesives are a particularly useful class of adhesives. Such adhesives include acrylic adhesives, block copolymer adhesives, diene polymer based adhesives and the like. A description of useful pressure-sensitive adhesives may be found in *Encyclopedia of Polymer Science and Engineering*, Vol. 13, Wiley-Interscience Publishers (New York, 1988). Additional description of useful pressure-sensitive adhesives may be found in *Encyclopedia of Polymer Science and Technology*, Vol. 1, Interscience Publishers (New York, 1964).

The present invention may be used in a variety of applications. Examples of these utilities are shown in FIGS. 1–6 in which like reference numbers refer to the same elements.

FIG. 1 shows a cross-sectional view of a substrate 10 bearing a layer 12 of the composition of the invention on one of its surfaces. Preferably substrate 10 is a thin flexible material and coating 12 is cured. The embodiment shown in FIG. 1 is useful as a release liner and as a backing for a pressure sensitive adhesive.

Figure 2:
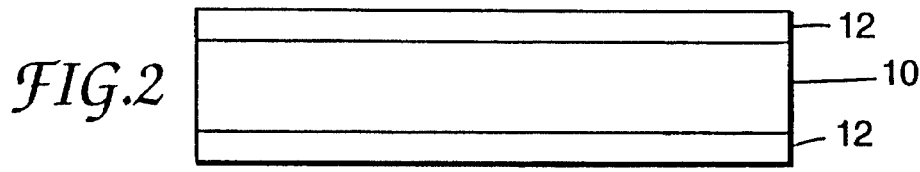
FIG. 2 is a plan view of a second embodiment of the invention in which the coating of the composition of the invention is present on opposite surfaces of the substrate.

FIG. 2 shows a cross-sectional view of a variation of the embodiment shown in FIG. 1. In FIG. 2, substrate 10 has a layer 12 of the composition of the invention on both of its surfaces. This embodiment is useful whenever a two-sided release capability is desired. It should be noted that one of the surfaces of the embodiment of FIG. 2 could also be coated with a layer of a pressure-sensitive adhesive to provide a transfer tape.

Figure 3:
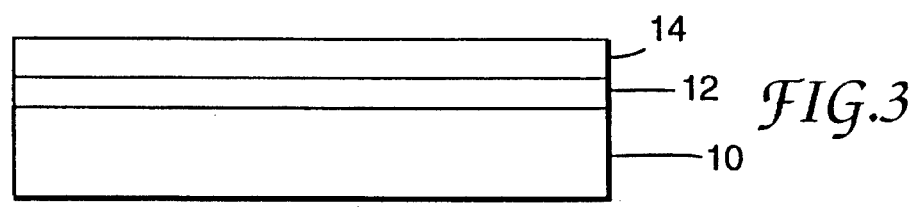
FIG. 3 is a plan view of a third embodiment of the invention in which a pressure-sensitive adhesive is applied over the surface of the coating of the composition of the embodiment of FIG. 1.

FIG. 3 shows a cross-sectional view of a substrate 10 which has a layer 12 of the composition of the invention on one of its surfaces. A layer 14 of a pressure-sensitive adhesive is provided on layer 12. This embodiment is useful as an adhesive tape.

Figure 4:
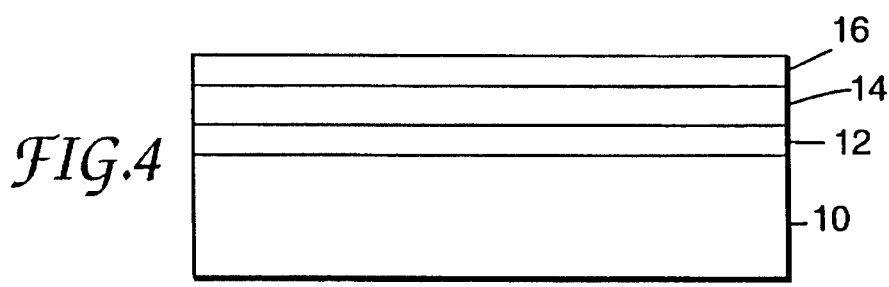
FIG. 4 is a plan view of a fourth embodiment of the invention in which the adhesive surface of a pressure-sensitive adhesive tape is applied to the surface of the coating composition of the embodiment of FIG. 1.

FIG. 4 shows a cross-sectional view of the embodiment of FIG. 1 to which an adhesive product comprising an adhesive layer 14 and a backing 16 has been secured. This embodiment is useful as a label stock, die cut product, decorative applique, single-sided tape, surgical drape, diaper tape, etc.

Figure 5:
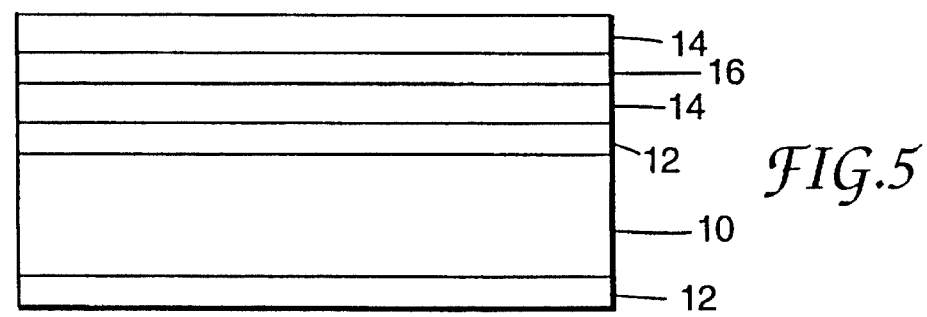
FIG. 5 is a plan view of a fifth embodiment of the invention similar to the embodiment illustrated in FIG. 4 except employing a two-sided pressure-sensitive adhesive tape.

FIG. 5 shows a cross-sectional view of a double-coated adhesive tape secured to a removable liner. The double-coated adhesive tape comprises a backing 16 having a layer 14 of adhesive secured to both of its surfaces. The liner comprises a substrate 10 which has a layer 12 of the composition of the invention on each of its surfaces. The adhesive layer 14 is in contact with one of the layers 12 of the removable liner.

Figure 6:
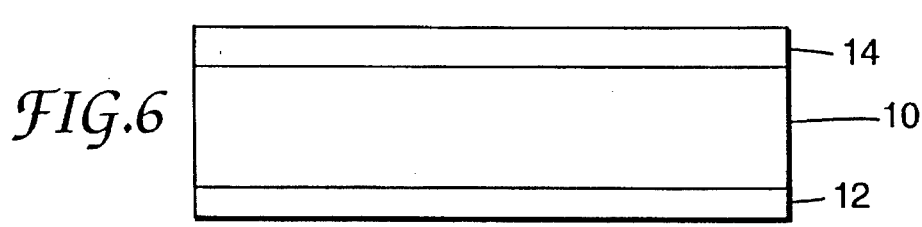
FIG. 6 is a plan view of a sixth embodiment of the invention in which a pressure-sensitive adhesive is applied to the second surface of the embodiment of FIG. 1.

FIG. 6 shows an adhesive tape. The tape comprises a substrate 10 which has a layer 14 of pressure-sensitive adhesive on one of its surfaces and a layer 12 of the composition of the invention on the other of its surfaces.

Each of the embodiments shown in the Figures may be wound upon themselves in a roll form. In the case of the embodiments of FIGS. 3, 5 and 6, it may be desirable to provide a release surface on the exposed surface of the substrate 10 to prevent the adhesive from adhering to substrate 10. This may be accomplished in a number of ways. For example, the exposed surface of substrate 10 may be treated with a particulate material. Alternatively, it may have a low adhesion backsize material on it to prevent adhesion. Low adhesion backsize materials useful herein include polyolefins; cured silicones; polyurethanes; blends of silicones with polyolefins; blends of fluorochemicals with polyolefins; polyurethanes; or fluorochemicals grafted to polyolefins or similar polymers; and the like. Low adhesion backsize materials are described in the literature. See for example, U.S. Pat. Nos. 2,532,011; 2,607,711; and 3,318,852.

The following examples are presented to illustrate the invention to those skilled in the art and should not be construed as limiting the invention, which is properly delineated in the appended claims. All proportions by parts or percents are by weight unless otherwise stated.

Base Polymers

A series of base polymers was employed in the following examples. These polymers were prepared by the following representative procedure.

In a half-gallon polyethylene bottle were combined 925.3 g of octamethylcyclotetrasiloxane (3.119 mol), 66.4 g of 1,3,5,7-tetramethylcyclotetrasiloxane (0.276 mol), 30.9 g of 1,1,3,3-tetramethyldisiloxane (0.230 mol), 5.1 g of activated carbon and 1.0 g of concentrated sulfuric acid. The mixture was agitated at room temperature for 24 hr and filtered. Volatiles were separated from the filtrate at 200° C. using a thin film evaporator to give 884.0 g of the intermediate product. A 5-L four-necked round-bottomed flask equipped for mechanical stirring was charged with 300.0 g of 1,5-hexadiene (3.652 mol) and 200 mL of heptane and fitted with a 1-L addition funnel and a reflux condenser. The addition funnel was charged with a solution of the intermediate product and 250 mL of heptane. A 20 mL syringe was charged with a solution 200 mg of a precious metal-containing catalyst (15 wt % Pt in $ViMe_2SiOSiMe_2Vi$, 25 ppm) in 12 mL of heptane and fitted to a syringe pump. A length of 20-gauge Teflon™ tubing was attached to the syringe leading into the reaction mixture through a rubber septum fitted to the fourth neck of the flask. The reaction mixture was heated to 60° C. stirring was begun, and the solutions of the intermediate product and platinum catalyst were added simultaneously, the former dropwise, the latter at a rate of 1.7 mL/hr. After the addition of the intermediate product was complete, the addition of the platinum catalyst was stopped, and the reaction mixture was stirred at 60° C. for 3 hr, when analysis of an aliquot by IR indicated complete consumption of silane (absence of Si—H band at 2160 $cm^{-1}$). In order to adsorb the platinum catalyst, 15 g of colloidal clay (Attagel®-50) was added, and the mixture was stirred at room temperature overnight. The reaction mixture was filtered, and volatiles were separated on a rotary evaporator at 0.5 mm and 60° C. to give 975.1 g of product base polymer G.

$^1$H and $^{29}$Si NMR analysis of the product indicated a polymer with the average structure (5-hexenyl)Me$_2$SiO[Si(5-hexenyl)MeO]$_{4.6}$[SiMe$_2$O]$_{57.7}$SiMe$_2$(5-hexenyl).

Base polymers C, D, E, F, and H were prepared in an analogous fashion.

$^1$H and $^{29}$Si NMR analysis of Syl-Off™ 7681 and 7686, (commercially available from Dow Corning Corporation) indicated that these formulations contained base polymers A and B, respectively.

The structures of base polymers A through H are given below:

| Polymer | Structure | mol % Hex |
|---|---|---|
| A | HexMe$_2$SiO(SiMe$_2$O)$_{119.0}$SiMeHex | 1.7 |
| B | HexMe$_2$SiO(SiMe$_2$O)$_{176.8}$(SiMeHexO)$_{2.3}$SiMe$_2$Hex | 2.4 |
| C | HexMe$_2$SiO(SiMe$_2$O)$_{76.4}$(SiMeHexO)$_{1.6}$SiMe$_2$Hex | 4.5 |
| D | HexMe$_2$SiO(SiMe$_2$O)$_{65.1}$(SiMeHexO)$_{1.7}$SiMe$_2$Hex | 5.4 |
| E | HexMe$_2$SiO(SiMe$_2$O)$_{69.8}$(SiMeHeXO)$_{3.3}$SiMe$_2$Hex | 7.1 |
| F | HexMe$_2$SiO(SiMe$_2$O)$_{79.1}$(SiMeHexO)$_{5.9}$SiMe$_2$Hex | 9.1 |
| G | HexMe$_2$SiO(SiMe$_2$O)$_{57.7}$(SiMeHeXO)$_{4.6}$SiMe$_2$Hex | 10.2 |
| H | HexMe$_2$SiO(SiMe$_2$O)$_{54.0}$(SiMeHexO)$_{5.6}$SiMe$_2$Hex | 12.3 |

In these structures,

Hex=5-hexenyl (i.e., CH$_2$=CH—CH$_2$—CH$_2$—CH$_2$—)

Me=methyl (i.e., CH$_3$—)

Crosslinking Agent

The crosslinking agent employed in the examples comprised a 1:1 by weight mixture of Me$_3$SiO(Me$_2$SiO)$_{15}$(MeHSiO)$_{25}$SiMe$_3$ and Me$_3$SiO(MeHSiO)$_{40}$SiMe$_3$.

These materials are respectively Syl-Off™ 7678 and 7048 (commercially available from Dow Corning Corporation).

Catalyst

The catalyst employed in the examples is Syl-Off™ 7127 (commercially available from Dow Corning Corporation).

Inhibitor

The inhibitor employed in the examples was a 70:30 mixture by weight of diethyl fumarate and benzyl alcohol, each commercially available from Aldrich Chemical Company.

Organopolysiloxane Gum

A series of ethylenically unsaturated gums was employed in the following examples. They were prepared by the following representative procedure.

In a 500 mL three necked resin flask equipped for mechanical stirring were combined 230.0 g of octamethylcyclotetrasiloxane (775 mmol), 1.48 g of a (5-hexenyl)dimethylsiloxy endblocked polydimethylsiloxane having the average structure (5-hexenyl)Me$_2$SiO(SiMe$_2$O)$_{145}$SiMe$_2$(5-hexenyl)(0.13 mmol, prepared in a manner analogous to that described for the preparation of polymer G above), and 14 mg of potassium hydroxide (0.25 mmol). The reaction mixture was heated with stirring to 160° C. under an argon atmosphere. Initially rapid, the rate of stirring was decreased as the viscosity of the reaction mixture increased. After 48 hr the base catalyst was quenched by passing a stream of carbon dioxide through the hot reaction mixture with continued stirring for approximately 5 hr. The product was transferred to an open aluminum pan, spread into a 5 mm thick layer, and devolatilized in a forced air oven at 150° C. for 6 hr. Analysis of the final product G7 by GPC indicated a peak molecular weight of 473,000, corresponding to an average degree of polymerization (dp) of 6390.

The resulting gums had the formula

HexMe$_2$SiO(SiMe$_2$O)$_x$(SiMeHexO)$_y$SiMe$_2$Hex

The following organopolysiloxane gums were prepared:

| Gum | dp (x + y) | Mol % Hex |
|---|---|---|
| G1 | 10200 | 0.16 |
| G2 | 1210 | 0.17 |
| G3 | 1800 | 0.11 |
| G4 | 2820 | 0.07 |
| G5 | 3490 | 0.06 |
| G6 | 8560 | 0.05 |
| G7 | 6390 | 0.03 |

The dp was determined by dividing the peak molecular weight from GPC analysis by 74. Higher values of dp indicate higher molecular weight materials.

Coating Methods

Compositions were prepared by combining base polymer, organopolysiloxane gum, catalyst, inhibitor, and crosslinking agent as described in the following examples except for base polymers A and B which were received premixed with catalyst and inhibitor. The resultant compositions were coated onto polyethylene-coated Kraft paper using a five smooth roll coater set up in-line with a 10 ft (3.05 m) impinged air oven. The coating compositions were applied at a coating weight of about 1 g/m$^2$ and cured at 116° C. (240° F.) at 12 seconds oven residence time (50 ft/min (15.24 m/min)) through the oven.

The following test methods were employed in the examples:

Coefficient of Friction

The coefficients of friction of the cured silicone coatings were determined by the following procedure, based on ASTM D 1894-63, sub-procedure A. An approximately 10×6 inch (25×15 cm) area of the silicone-coated substrate was adhered to the platform of an IMASS Slip/Peel tester (model SP-102B-3M90) such that the silicone-coated surface was exposed. Care was taken to insure that the silicone surface of the silicone-coated substrate was untouched, uncontaminated, flat, and free of wrinkles. The sample surface and the friction sled (model SP-101038, wrapped with 3.2 mm thick, medium-density foam rubber) were blown with compressed air to remove any loose dust or debris, the friction sled was placed on the silicone surface, and the chain attached to the sled was affixed to the force transducer of the IMASS Slip/Peel tester. The platform of the IMASS Slip/Peel tester was set in motion at a speed of 6 in/min (15 cm/min), thereby dragging the friction sled across the silicone surface. The instrument calculated and reported the average kinetic frictional force, omitting the static frictional force. The kinetic coefficient of friction was obtained by dividing the kinetic frictional force by the weight of the friction sled.

Release Values

The release values of the cured silicone coatings were determined by the following procedure. A heptane-methyl ethyl ketone solution of pressure-sensitive adhesive comprising isooctyl acrylate (95.5 wt %)-acrylic acid (4.5 wt %) copolymer, as described in Example 5 of U.S. Pat. No. Re. 24,906 was applied to the cured silicone coating and dried for 5 minutes in a circulating air oven to give a dry coating weight of 32 g/m². A biaxially oriented film of polyethylene terephthalate (PET, 38 micrometers thick) was pressed against the surface of the coating to produce a laminate consisting of a pressure-sensitive adhesive tape and a silicone-coated substrate. The laminate was cut into 1.0×10 inch (2.5×25 cm) strips. The release force is the force required to pull the PET film with the adhesive attached thereto (i.e., a pressure-sensitive adhesive tape) away from the silicone coated substrate at an angle of 180° and a pulling speed of 90 in/min (230 cm/min).

Readhesion Value

The readhesion values of the pressure-sensitive adhesive tapes were determined by the following procedure. The pressure-sensitive adhesive tapes, as removed from the silicone coated surface, were applied to the surface of a clean stainless steel plate.. The readhesion value is the force required to pull the tape from the steel surface at an angle of 180° and a pulling speed of 12 in/min(30 cm/min).

Release and readhesion data were obtained using an IMASS Slip/Peel tester (model SP-102B-3M90). Release and readhesion values were determined both on samples that had stood undisturbed at room temperature for three days (initial) and on samples that had been heated at 70° C. for three days (aged).

EXAMPLES 1–7

To each of seven 60.0 g samples of Sly-Off™ 7686(containing base polymer B) was added 1.80 g (3.0 wt %) of one of the organopolysiloxane gums G1 through G7. The resultant mixtures were agitated on a mechanical shaker until they were homogeneous (approximately 48 hr). To a 30.0 g portion of each of these mixtures was added 0.90 g of crosslinking agent. The seven resultant compositions were coated, cured, and tested as described above, and the results are recorded in Table I.

TABLE I

| Ex. | Gum | COF | Release (N/dm) | | Readhesion (N/dm) | |
| --- | --- | --- | --- | --- | --- | --- |
| | | | Initial | Aged | Initial | Aged |
| 1 | G1 | 0.29 | 0.31 | 0.39 | 36.1 | 33.9 |
| 2 | G2 | 0.26 | 0.23 | 0.35 | 37.2 | 33.9 |
| 3 | G3 | 0.23 | 0.27 | 0.35 | 40.5 | 33.9 |
| 4 | G4 | 0.23 | 0.27 | 0.35 | 42.7 | 41.6 |
| 5 | G5 | 0.18 | 0.27 | 0.35 | 44.8 | 30.6 |
| 6 | G6 | 0.23 | 0.31 | 0.39 | 35 | 35 |
| 7 | G7 | 0.17 | 0.23 | 0.35 | 39.4 | 33.9 |

EXAMPLES 8–13 and C1

To a 60.0 g sample of base polymer D was added 0.31 g of the organopolysiloxane gum G7, the resultant mixture was agitated on a mechanical shaker until it was homogeneous (approximately 48 h), and 0.78 g of inhibitor and 1.40 g of catalyst were added to give a mixture containing 0.5 wt % of the organopolysiloxane gum G7. To a 30.0 g portion of this mixture was added 1.78 g of crosslinking agent. Similarly prepared were mixtures of 60.0 g of base polymer D, 0.62 g of gum, 0.78 g of inhibitor, and 1.40 g of catalyst (1.0 wt % gum), to 30.0 g of which mixture was added 1.77 g of crosslinking agent; 70.0 g of base polymer D, 2.18 g of gum, 0.91 g of inhibitor, and 1.64 g of catalyst (3.0 wt % gum), to 30 g of which mixture was added 1.74 g of crosslinking agent; 60.0 g of base polymer D, 3.13 g of gum, 0.78 g of inhibitor, and 1.40 g of catalyst (5.0 wt % gum), to 30.0 g of which mixture was added 1.71 g of crosslinking agent; 60.0 g of base polymer D, 6.23 g of gum, 0.78 g of inhibitor, and 1.40 g of catalyst (10.0 wt % gum), to 30.0 g of which mixture was added 1.63 g of crosslinking agent; 60.0 g of base polymer D, 12.47 g of gum, 0.78 g of inhibitor, and 1.40 g of catalyst (20.0 wt % gum), to 30.0 g of which mixture was added 1.49 g of crosslinking agent. A control formulation (Comparative Example 1) was prepared by combining 30.0 g of base polymer D, 0.39 g of inhibitor, 0.70 g of catalyst, and 1.79 g of crosslinking agent. The eight resultant compositions were coated, cured, and tested as described above, and the results are recorded in Table II.

TABLE II

| Ex. | Wt % G7 | Viscosity (Cps) | COF | Release (N/dm) | | Readhesion (N/dm) | |
| --- | --- | --- | --- | --- | --- | --- | --- |
| | | | | Initial | Aged | Initial | Aged |
| C1 | 0.0 | 180 | 0.45 | 0.27 | 0.62 | 29.5 | 31.7 |
| 8 | 0.5 | 200 | 0.14 | 0.31 | 0.58 | 29.5 | 30.6 |
| 9 | 1.0 | 250 | 0.11 | 0.31 | 0.54 | 30.6 | 30.6 |
| 10 | 3.0 | 460 | 0.09 | 0.31 | 0.5 | 30.6 | 30.6 |
| 11 | 5.0 | 870 | 0.09 | 0.31 | 0.5 | 29.5 | 30.6 |
| 12 | 10.0 | 3760 | 0.12 | 0.35 | 0.5 | 29.5 | 29.5 |
| 13 | 20.0 | 26600 | 0.16 | 0.31 | 0.5 | 31.7 | 29.5 |

EXAMPLES 14–17 and C2

To each of four separate 60.0 g samples of Syl-Off™ 7686(containing base polymer B) was added either 1.6 g (1 wt %), 1.8 g (3 wt %), 3.0 g (5 wt %) or 6.0 g (10 wt %) of the organopolysiloxane gum G7, and the resultant mixtures were agitated on a mechanical shaker until they were homogeneous (approximately 48 h). To a 30.0 g portion of each of these mixtures was added 0.92 g, 0.90 g, 0.88 g, and 0.84 g, respectively, of crosslinking agent. A control formulation (Comparative Example 2) was prepared by combining 30.0 g of Syl-Off™ 7686 and 0.93 g of crosslinking agent. The five resultant compositions were coated, cured, and tested as described above, and the results are recorded in Table III.

TABLE III

| Ex. | Wt % G7 | Viscosity (Cps) | COF | Release (N/dm) | | Readhesion (N/dm) | |
| --- | --- | --- | --- | --- | --- | --- | --- |
| | | | | Initial | Aged | Initial | Aged |
| C2 | 0.0 | 450 | 0.43 | 0.23 | 0.31 | 35 | 38.3 |
| 14 | 1.0 | 600 | 0.21 | 0.27 | 0.42 | 37.2 | 36.1 |
| 15 | 3.0 | 1090 | 0.17 | 0.23 | 0.35 | 39.4 | 33.9 |
| 16 | 5.0 | 1900 | 0.17 | 0.31 | 0.42 | 38.3 | 32.8 |
| 17 | 10.0 | 6880 | 0.15 | 0.27 | 0.42 | 37.2 | 35.0 |

EXAMPLES 18–25

To a 75.0 g sample of base polymer D were added 0.98 g of inhibitor, 1.95 g of catalyst, and 2.34 g of the organopolysiloxane gum G7, and the resultant mixture containing 3 wt % of the organopolysiloxane gum G7 was agitated on a mechanical shaker until it was homogeneous (approximately 48 h). To a 50.0 g portion of this mixture was added 3.10 g of crosslinking agent. Similarly prepared were mixtures of 60.0 g of base polymer C, 1.87 g of gum, 0.78 g of inhibitor, and 1.40 g of catalyst (3 wt % gum), to which mixture was added 1.77 g of crosslinking agent; 75.0 g of base polymer E, 2.34 g of gum, 0.98 g of inhibitor, and 1.95 g of catalyst (3 wt % gum), to 50.0 g of which mixture was added 3.98 g of crosslinking agent; 100.0 g of base polymer H, 3.00 g of gum, 1.30 g of inhibitor, and 2.60 g of catalyst (3 wt % gum), to 50.0 g of which mixture was added 6.66 g of crosslinking agent. To 200.0 g of base polymer F were added 2.60 g of inhibitor and 5.2 g of catalyst. To a 75.0 g portion of this mixture was added 2.25 g of the organopolysiloxane gum G7 (3 wt % gum), and the resultant mixture was agitated on a mechanical shaker until it was homogeneous (approximately 48 h). To a 50.0 g portion of this mixture was added 5.40 g of crosslinking agent. Similarly prepared was a mixture of 200.0 g of base polymer G, 2.60 g of inhibitor, and 5.2 g of catalyst, to 75.0 g of which mixture was added 2.25 g of gum G7 (3 wt % gum). To a 50.0 g portion of this mixture was added 5.40 g of crosslinking agent. To a 75.0 g sample of Syl-Off™ 7681 (containing base polymer A) was added 2.25 g of organopolysiloxane gum G7 (3 wt % gum), and the resulting mixture was agitated on a mechanical shaker until it was homogeneous (approximately 48 h). To a 30.0 g portion of this mixture was added 0.67 g of crosslinking agent. Similarly prepared was a mixture of 75.0 g of Syl-Off™ 7686 (containing base polymer B) and 2.25 g of gum G7 (3 wt % gum), to 30.0 g of which mixture was added 0.92 g of crosslinking agent. The eight resultant compositions were coated, cured, and tested as described above, and the results are recorded in Table IV.

TABLE IV

| Ex. | Base Polymer | COF | Release (N/dm) Initial | Release (N/dm) Aged | Readhesion (N/dm) Initial | Readhesion (N/dm) Aged |
|---|---|---|---|---|---|---|
| 18 | A | 0.23 | 0.27 | 0.42 | 35 | 35 |
| 19 | B | 0.17 | 0.23 | 0.35 | 39.4 | 33.9 |
| 20 | C | 0.2 | 0.35 | 0.39 | 33.9 | 30.6 |
| 21 | D | 0.08 | 0.35 | 0.5 | 29.5 | 28.4 |
| 22 | E | 0.07 | 0.39 | 0.5 | 30.6 | 27.3 |
| 23 | F | 0.06 | 0.46 | 0.62 | 30.6 | 28.4 |
| 24 | G | 0.07 | 0.42 | 0.5 | 32.8 | 25.2 |
| 25 | H | 0.08 | 0.46 | 0.62 | 35 | 29.5 |

We claim:

1. A curable coating composition comprising:

(a) an ethylenically unsaturated organopolysiloxane base polymer having a viscosity of from 25 to about 5,000 centipoise at 25° C.

(b) an organohydrogenpolysiloxane crosslinking agent;

(c) an effective amount of a precious metal containing hydrosilylation catalyst; and (d) from 0.1 to 20 weight percent of the composition of a higher alkenyl-functional organopolysiloxane gum; wherein said gum is a triorganosiloxy endblocked polydiorganosiloxane polymer having an average molecular weight of at least 75,000 as measured by gel permeation chromatography and having the formula comprising $R_2SiO_{2/2}$ and $R_3SiO_{1/2}$ units wherein each R group is independently selected from the group consisting of saturated and ethylenically unsaturated, hydrocarbon radicals, provided that at least two of said R groups are higher alkenyl radicals.

2. The curable coating composition of claim 1 wherein the higher alkenyl radicals are represented by the formula —R'$(CH_2)_m$CH=$CH_2$ wherein R' is selected from the group consisting of —$(CH_2)_n$— and —$(CH_2)_p$CH=CH— wherein m is 1, 2, or 3;

n is 0, 3, or 6; and p is 3, 4, or 5.

3. The curable coating composition of claim 2 wherein the higher alkenyl radicals are 5-hexenyl radicals.

4. The curable coating composition of claim 3 wherein the saturated hydrocarbon radical are methyl radicals.

5. The curable coating composition of claim 1 wherein the higher alkenyl radicals in the gum are present at a level up to 5 mole percent of the average total number of moles of silicon atoms per one mole of gum.

6. The curable coating composition of claim 5 wherein the higher alkenyl radicals in the gum are present at a level less than 2 mole percent of the average total number of moles of silicon atoms per one mole of gum.

7. The curable coating composition of claim 6 wherein the higher alkenyl radicals in the gum are present at a level less than 0.5 mole percent of the average total number of moles of silicon atoms per one mole of gum.

8. The curable coating composition of claim 7 wherein the higher alkenyl radicals in the gum are present at a level than 0.2 mole percent of the average total number of moles of silicon atoms per one mole of gum.

9. The cured product of the composition of claim 1.

10. The cured product of claim 1 having a coefficient of friction that is lower than that of a cured product obtained from a mixture comprising components (a), (b) and (c), but omitting component (d).

11. The curable coating composition of claim 1 containing from 0.5 to 10 weight percent of the composition of the higher alkenyl-functional organopolysiloxane gum.

12. The curable coating composition of claim 1 containing from 1 to 5 weight percent of the composition of the higher alkenyl-functional organopolysiloxane gum.

* * * * *